May 28, 1957  F. A. KROHM  2,793,912
NOZZLE ASSEMBLY
Filed May 7, 1954

INVENTOR.
FRED A. KROHM
BY
Charles S. Lenfest
ATTORNEY

United States Patent Office 2,793,912
Patented May 28, 1957

2,793,912

NOZZLE ASSEMBLY

Fred A. Krohm, Hobart, Ind., assignor to Productive Inventions, Inc., a corporation of Indiana Application May 7, 1954, Serial No. 428,246

4 Claims. (Cl. 299—73)

This invention relates generally to windshield cleaning equipment and more particularly is directed to a nozzle or spray device used with such equipment.

One of the principal objects of the invention is to provide a nozzle assembly embodying improved principles of design and construction.

Another object of the invention is to provide an assembly comprising a nozzle and a support therefor which are operatively connected together in a manner to provide a leak-proof connection permitting relative movement therebetween.

An additional object of the invention is to provide a nozzle assembly comprised of a plurality of members which can be economically manufactured and assembled and offer advantages with respect to adjustment and convenience of installation.

Other objects and advantages of the invention will become apparent after the description hereinafter set forth is considered in conjunction with the drawings annexed hereto.

In the drawings wherein one embodiment of the invention is exemplified:

Referring more particularly to the drawings, the nozzle assembly includes a nozzle generally designated 1, a support 2 therefor and a mounting 3 for this assembly.

Figure 1:
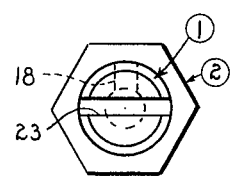
Figure 1 is an end view of the nozzle assembly comprising a nozzle and support.
Figure 2:
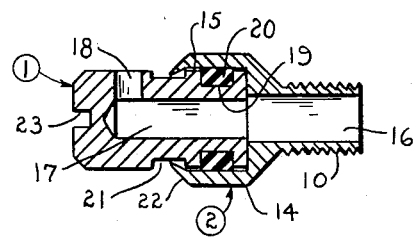
Figure 2 is a longitudinal section taken through the assembly illustrated in Figure 1 showing the operative connection between the nozzle and support.
Figure 3:
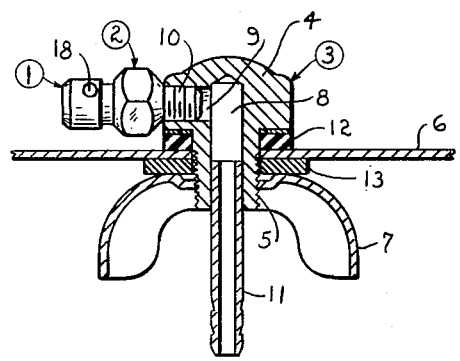
Figure 3 is a partial elevational view with portions in section for the purpose of illustrating the manner in which the nozzle assembly is detachably secured to a mounting.

As clearly shown in Figure 3, the mounting includes a head portion 4 and an exteriorly threaded extension 5. The extension is adapted to extend through a suitable hole provided therefor in a cowl 6 of a vehicle body and a wing nut 7 is threadedly connected to the extension for securing the device in place. The extension of the mounting is provided with an axial bore or passage 8 which extends into the head portion and communicates with a threaded transverse opening or passage 9. A tubular exteriorly threaded portion 10 of the support 2 of the nozzle assembly is connected to the threaded portion of the passage 9. The extension 5 of the mounting is preferably provided with a tubular part 11 to which a hose or conduit may be detachably connected. A resilient washer 12 is preferably interposed between the head of the mounting and the cowl and metal washer 13 is also preferably interposed between the wing nut and the cowl so as to seal and impart rigidity to the connection.

The support 2 constituting a component of the nozzle assembly includes the tubular threaded portion 10 above referred to and also a socket or cup portion 14 constructed to provide a cylindrical chamber 15 which is of a diameter somewhat greater than an axial passage 16 provided in the extension. The socket portion of the support is preferably formed like a nut to facilitate connection and adjustment of the support on the mounting.

The nozzle 1 is elongated and, among other things, is provided with an axial bore or passage 17 and a transverse passage or outlet 18. The inner extremity of the nozzle is provided with an exterior annular groove 19 within which is disposed a gasket 20 of resilient material, preferably of plastic. The nozzle is further provided with an additional exterior annular groove 21. The nozzle is adapted to be forcibly pressed into the chamber 15 so that the gasket or seal 20 is under compression after which the tapered rim 22 of the support is forced into the groove 21 so that the nozzle and support are permanently interlocked. This structure affords a leak-proof connection between the nozzle and the support and permits one to manipulate and adjust the nozzle with respect to the support, and to facilitate such manipulation the outer end of the fitting is preferably provided with a slot 23 of a size which may receive the blade of a screwdriver or some other instrument.

In view of the foregoing, it will be manifest that the mounting can be readily connected and adjusted on the cowl to locate the nozzle 1 in a predetermined radial position and that the connections between the support and mounting and between the nozzle and support afford additional means for adjusting the nozzle to locate its outlet in a desirable position so that liquid ejected therefrom under pressure will be applied to the windshield where desired.

Attention is directed to the fact that the tolerances or cross-sectional dimensions between the inner end of the nozzle and the chamber 15 are preferably such that the cylindrical surface of the nozzle will not ordinarily engage the cylindrical surface of the chamber. In other words, except for the gasket 20, an annular space is provided between the nozzle and support, the purpose of which is to insure a positive leak-proof connection and which will permit rotary adjustment of the nozzle.

Having thus described my invention, it is obvious that various modifications may be made in the same without departing from the spirit of the invention; and, therefore, I do not wish to be understood as limiting myself to the exact forms, constructions, arrangements and combinations of parts herein shown and described.

I claim:

1. A spray device of the kind described comprising a body having a base portion for support relative to a mounting for the body and an integral portion projecting from said base portion for entry through an aperture provided in the mounting, a fastener connected to said extending portion for attaching the device to the mounting with the latter clamped between the base portion and fastener, said projecting portion having an axial passage and said body having an axial passage constituting a continuation of the passage in said projecting portion, said body also being provided with a transverse threaded aperture intersecting the passage in the body, a fitting having an integral reduced exteriorly threaded portion secured in the aperture of the body and an enlargement located exteriorly of the body and having a socket therein, said reduced portion being provided with an axial passage communicating with the passage in the body, said enlargement being provided wtih means to facilitate manual rotation of the fitting, a straight nozzle having a grooved inner part disposed in the socket and an outer part axially aligned with the inner part, a seal secured in the groove and frictionally bearing against an inner surface of the socket, means on said socket cooperating with a portion of the nozzle for retaining the nozzle in sealed relationship to the socket, said nozzle having a longitudinal passage, terminating short of its outer end, disposed axially of and communicating with the axial passage in the reduced portion of the fitting, said nozzle also being provided with an outlet port disposed transversely with respect to its longitudinal passage and communicating therewith at the outer end of the passage, and said outer part of the nozzle being provided with means to facilitate rotary adjustment thereof with respect to the fitting.

2. The structure defined in claim 1, in which the means on the enlargement of the fitting for facilitating rotation of the fitting is in the form of a nut, and the means on the outer part of the nozzle facilitating rotation of the nozzle is in the form of a slot.

3. The structure defined in claim 1, in which the integral portion projecting from the base portion of the body is externally threaded and the fastener connected thereto is a nut.

4. The structure defined in claim 1, including an elongated tubular member having one end secured in the axial passageway of the integral projecting portion of the body and its other end extended for connection with a conduit.

References Cited in the file of this patent
UNITED STATES PATENTS

| | | |
|---|---|---|
| 422,017 | Harris | Feb. 25, 1890 |
| 738,503 | Waters | Sept. 8, 1903 |
| 1,329,760 | Fulton | Feb. 3, 1920 |
| 2,289,650 | Horton | July 4, 1942 |
| 2,481,404 | Donner | Sept. 6, 1949 |
| 2,498,395 | Coss | Feb. 21, 1950 |
| 2,583,175 | Hautau | Jan. 22, 1952 |
| 2,609,561 | Wernig | Sept. 9, 1952 |
| 2,634,166 | Sacchini | Apr. 7, 1953 |
| 2,681,249 | Zabilka | June 15, 1954 |
| 2,703,259 | Neufeld | Mar. 1, 1955 |
| 2,729,507 | Wise | Jan. 3, 1956 |